(12) United States Patent
Varekamp et al.

(10) Patent No.: US 11,172,183 B2
(45) Date of Patent: Nov. 9, 2021

(54) APPARATUS AND METHOD FOR PROCESSING A DEPTH MAP

(71) Applicant: KONINKLIJKE PHILIPS N.V., Eindhoven (NL)

(72) Inventors: Christiaan Varekamp, Eindhoven (NL); Wilhelmus Hendrikus Alfonsus Bruls, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 9 days.

(21) Appl. No.: 16/607,394

(22) PCT Filed: Apr. 26, 2018

(86) PCT No.: PCT/EP2018/060775
§ 371 (c)(1),
(2) Date: Oct. 23, 2019

(87) PCT Pub. No.: WO2018/197630
PCT Pub. Date: Nov. 1, 2018

(65) Prior Publication Data
US 2020/0077071 A1    Mar. 5, 2020

(30) Foreign Application Priority Data

Apr. 26, 2017 (EP) .................... 17168272

(51) Int. Cl.
*G06K 9/00* (2006.01)
*H04N 13/128* (2018.01)
*H04N 13/271* (2018.01)
*H04N 13/261* (2018.01)
*H04N 13/00* (2018.01)

(52) U.S. Cl.
CPC ......... *H04N 13/128* (2018.05); *H04N 13/261* (2018.05); *H04N 13/271* (2018.05); *G06T 2207/10028* (2013.01); *H04N 2013/0081* (2013.01)

(58) Field of Classification Search
CPC .................................................. H04N 13/128
See application file for complete search history.

(56) References Cited

U.S. PATENT DOCUMENTS

| 8,447,141 B2 | 5/2013 | Barenbrug |
| 2010/0046837 A1 | 2/2010 | Boughorbel |
| 2011/0096832 A1 | 4/2011 | Zhang et al. |

(Continued)

FOREIGN PATENT DOCUMENTS

WO    2016202837 A1    12/2016

*Primary Examiner* — Oneal R Mistry

(57) ABSTRACT

An apparatus for processing a depth map comprises a receiver (203) receiving an input depth map. A first processor (205) generates a first processed depth map by processing pixels of the input depth map in a bottom to top direction. The processing of a first pixel comprises determining a depth value for the first pixel for the first processed depth map as the furthest backwards depth value of: a depth value for the first pixel in the input depth map, and a depth value determined in response to depth values in the first processed depth map for a first set of pixels being below the first pixel. The approach may improve the consistency of depth maps, and in particular for depth maps generated by combining different depth cues.

20 Claims, 8 Drawing Sheets

(a)

(b)

(c)

(56) References Cited

U.S. PATENT DOCUMENTS

| | | | |
|---|---|---|---|
| 2011/0181588 A1* | 7/2011 | Barenbrug | G06T 15/205 |
| | | | 345/419 |
| 2012/0113094 A1 | 5/2012 | Shimoyama et al. | |
| 2015/0023588 A1* | 1/2015 | Barone | G06T 7/593 |
| | | | 382/154 |
| 2015/0222879 A1* | 8/2015 | Hamachi | G06T 5/001 |
| | | | 348/47 |
| 2016/0234474 A1 | 8/2016 | Zhang et al. | |
| 2016/0337640 A1* | 11/2016 | Ma | H04N 13/296 |
| 2017/0178351 A1* | 6/2017 | Kerbiriou | G06T 7/50 |

* cited by examiner (a) (b) (c)

APPARATUS AND METHOD FOR PROCESSING A DEPTH MAP

CROSS-REFERENCE TO PRIOR APPLICATIONS

This application is the U.S. National Phase application under 35 U.S.C. § 371 of International Application No. PCT/EP2018/060775, filed on Apr. 26, 2018, which claims the benefit of EP Patent Application No. EP 17168272.7, filed on Apr. 26, 2017. These applications are hereby incorporated by reference herein.

FIELD OF THE INVENTION

The invention relates to an apparatus and method for processing a depth map and in particular, but not exclusively, to processing of a depth map generated by combining a plurality of depth cues.

BACKGROUND OF THE INVENTION

Traditionally, technical processing and use of images has been based on two-dimensional imaging but increasingly the third dimension is being explicitly considered in image processing.

For example, three dimensional (3D) displays have been developed which add a third dimension to the viewing experience by providing a viewer's two eyes with different views of the scene being watched. This can be achieved by having the user wear glasses to separate two views that are displayed. However, as this may be considered inconvenient to the user, it is in many scenarios preferred to use autostereoscopic displays that use means at the display (such as lenticular lenses, or barriers) to separate views, and to send them in different directions where they individually may reach the user's eyes. For stereo displays, two views are required whereas autostereoscopic displays typically require more views (such as e.g. nine views).

In many embodiments it may be desirable to generate view images for new viewing directions. Whereas various algorithms are known for generating such new view images based on an image and depth information, they tend to be highly dependent on the accuracy of the provided (or derived) depth information.

Indeed, three dimensional image information is often provided by a plurality of images corresponding to different view directions for a scene. Specifically, video content, such as films or television programs, are increasingly generated to include some 3D information. Such information can be captured using dedicated 3D cameras that capture two simultaneous images from slightly offset camera positions.

However, in many applications, the provided images may not directly correspond to the desired directions, or more images may be required. For example, for autostereoscopic displays, more than two images are required, and indeed often 9-26 view images are used.

In order to generate images corresponding to different view directions, view point shifting processing may be employed. This is typically performed by a view shifting algorithm which uses an image for a single view direction together with associated depth information. However, in order to generate new view images without significant artefacts, the provided depth information must be sufficiently accurate.

Other exemplary applications include virtual reality experiences where right eye and left eye views may continuously be generated for a virtual reality headset to match the movement and change of orientation by the user. Such generation of dynamic virtual reality views may in many cases be based on light intensity images in combination with associated depth maps providing the relevant depth information.

The quality of the presented three-dimensional image/images from new views depends on the quality of the received image data, and specifically the three dimensional perception depends on the quality of the received depth information. However, in many practical applications and scenarios the provided depth information tends to be suboptimal. Indeed, in many practical applications and use scenarios, the depth information may not be as accurate as desired and errors, artefacts and/or noise may in the generated images may result from the suboptimal depth maps.

In many applications, depth information describing a real world scene may be estimated from depth cues that are determined from captured images. For example, depth information may be generated by estimating and extracting depth values by comparing view images for different view directions.

For example, in many applications, three dimensional scenes are captured as stereo images using two cameras at slightly different positions. Specific depth values may then be generated by estimating disparities between corresponding image objects in the two images. However, such depth extraction and estimation is problematic and tends to result in non-ideal depth values. This may again result in artefacts and a degraded three dimensional image quality.

Other depth cues that may be used to generate depth maps include for example relative motion between consecutive images in a sequence of images. For example, for a translating camera, objects that are closer to the camera will exhibit larger relative movement in the images, and thus larger displacement between different images in the sequence. This may be used to generate depth cues without relying on multiple simultaneous images from different view points. The approach will typically include compensation for the movement of the objects in the scene.

Another possible depth cue may be achieved by applying assumptions about the depth properties of a given scene/image. For example, for most images corresponding to e.g. a landscape, pixels lower in the image tends to be closer than pixels higher up in the image.

Unfortunately, all depth estimation approaches tend to have suboptimal performance and to generate suboptimal depth estimations. A particular problem is that the generated depth maps may not always be as consistent as desired and may for example show depth discontinuities between image objects which do not accurately reflect the depth variations in the scene.

Such inconsistencies may be particularly significant for systems in which depth maps are generated based on a plurality of different depth cues. The different depth estimations and depth cues tend to have different performance and accuracy for different image objects. For example, depth estimation based on predetermined depth assumptions may be suited for areas of the image corresponding to the background whereas e.g. motion estimation based depth cues provide better results for foreground image objects. Therefore, it is often advantageous to generate depth maps based on multiple cues but this does tend to result in degradations due to a lack of consistency between the different cues.

It has been suggested to address such depth inconsistencies by processing the depth map based on the visual information in the corresponding images. However, such processing risks introducing additional artefacts by a cross interference from the light intensity domain to the depth domain. Further, it tends to result in substantial additional computational complexity and resource requirements. As computational resource is a limiting factor for many image processing devices and systems, this may be a significant issue.

Hence, an improved approach for generating depth information would be advantageous and in particular an approach allowing increased flexibility, facilitated implementation, reduced complexity, reduced resource requirements, reduced sensitivity to visual variations, an improved 3D experience and/or improved depth information would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for processing a depth map, the apparatus comprising: a receiver for receiving an input depth map; a first processor for generating a first processed depth map by processing a plurality of first pixels of the input depth map in a bottom to top direction; wherein the processing of each first pixel of the plurality of first pixels comprises determining a depth value for the first pixel for the first processed depth map as the furthest backwards depth value of: a depth value for the first pixel in the input depth map, and a depth value determined in response to depth values in the first processed depth map for a first set of pixels being below the first pixel.

The invention may improve depth maps leading to improved three-dimensional image processing and perceived rendering quality. In particular, the approach may in many embodiments and scenarios provide a more consistent depth map, including improving and increasing consistency for depth maps based on combinations of different depth cues, such as for example combinations of motion based depth cues and predetermined depth profile depth cues. In particular, the approach may in many scenarios remove or reduce frequently encountered artefacts where objects positioned on the ground or floor may appear to float above this when rendered based on an inaccurate depth map.

The approach may in particular improve depth maps using a relatively low complexity and low resource demanding approach. The approach may for example allow sequential bit scanning and processing with low complexity local decisions being sufficient to increase overall consistency.

A pixel is below another pixel in the depth map if it is closer to the bottom of the depth map than this other pixel. Typically, the depth map may be an array of (horizontal) rows and (vertical) columns. In such scenarios, a pixel is below another pixel if it is in a row closer to the bottom than this other pixel.

A furthest backwards depth value of a set of depth values may be the depth value reflecting a position with the furthest distance to the (e.g. nominal or virtual) reference camera or viewpoint position. A furthest backwards depth value of a set of depth values may be the depth value reflecting a position closest to the background. A furthest backwards depth value of a set of depth values may be the depth value reflecting a maximum depth/distance from the viewing position. A furthest backwards depth value may be a depth value indicative of a depth furthest towards the back/background (furthest from the viewpoint).

The first set of pixels may be a contiguous region of pixels. The plurality of first pixels may form a contiguous region in the depth map.

The bottom to top direction may be achieved by the processing of a given pixel (specifically the first pixel) only being performing when the pixels of the first set for that given (first) pixel have already been processed. The apparatus may be arranged to iteratively process all pixels of the depth map(s).

In accordance with an optional feature of the invention, the first set of pixels comprises pixels of a row immediately below a row of the first pixel.

This may provide advantageous performance in many embodiments and scenarios. In some embodiments, the first set of pixels may only comprise pixels of a row immediately below a row of the first pixel.

In accordance with an optional feature of the invention, the first set of pixels comprises no more than 20 pixels.

This may provide advantageous performance in many embodiments and scenarios. The approach may provide effective improvement of depth maps while requiring only a low number of pixels to be considered for each given pixel thereby reducing computational requirements.

In some embodiments, the first set of pixels may advantageously comprise no more than 50, 30, 15, 10 or even 5 pixels. In some embodiments, the first set of pixels may advantageously comprise no less than 20, 15, 10, 5 or 3 pixels.

In accordance with an optional feature of the invention, the apparatus further comprises a second processor for generating a second processed depth map by processing a plurality of second pixels in the first processed depth map in a top to bottom direction; wherein generating a depth value for each second pixel in the second processed depth map comprises if a depth step criterion is met setting the depth value in the second processed depth map for the second pixel as a depth value of the first processed map for a third pixel for the second pixel, the third pixel being above the second pixel, and otherwise setting the depth value in the second processed depth map for the second pixel as a depth value for the second pixel in the first processed depth map; wherein the depth step criterion is dependent on depth steps both in the input depth map and in the first processed depth map.

This may improve performance in many embodiments and may in particular improve consistency and address potential errors, artefacts or inaccuracies introduced by the first processor.

A depth step may be a difference (specifically step difference) between the second pixel and another pixel. A depth step may be a depth change. The depth step criterion may require that a depth change (depth step) exceeds a threshold.

In accordance with an optional feature of the invention, the depth step criterion requires that an absolute value of a depth step in the input depth map is not above a first threshold and that a backwards depth step in the first processed image is not below a second threshold.

This may improve performance in many embodiments and may in particular improve consistency and address potential errors, artefacts or inaccuracies introduced by the first processor.

A backwards depth step may be depth difference between the second pixel and another pixel, where the depth is further back for the second pixel than for the other pixel. A backwards depth step may be a depth step/change towards the back/background (i.e. one increasing the depth/distance from the view position).

In accordance with an optional feature of the invention, the depth step criterion comprises a requirement that an absolute depth step in the input depth map between the third pixel and a pixel above the second pixel is not above a third threshold.

This may improve performance in many embodiments and may in particular improve consistency and address potential errors, artefacts or inaccuracies introduced by the first processor.

In accordance with an optional feature of the invention, the depth step criterion comprises a requirement that a maximum absolute depth step in the input image between the second pixel and a pixel above the second pixel is not above a fourth threshold.

This may improve performance in many embodiments and may in particular improve consistency and address potential errors, artefacts or inaccuracies introduced by the first processor.

In accordance with an optional feature of the invention, the depth step criterion comprises a requirement that a backwards depth step in the first processed image from the third pixel to the second pixel is not below a fifth threshold.

This may improve performance in many embodiments and may in particular improve consistency and address potential errors, artefacts or inaccuracies introduced by the first processor.

In accordance with an optional feature of the invention, the second processor is arranged to select the third pixel from a second set of pixels comprised in a row immediately above a row of the second pixel.

This may provide particularly advantageous performance in many scenarios. In many embodiments, the second set of pixels may comprise no more than 3, 5, 7, 10, 15, 20, 30 or 50 pixels and/or no less than 3, 5, 7, 10, 15, or 20 pixels.

In accordance with an optional feature of the invention, the first processor is arranged to determine the depth value of the first processed depth map for the first pixel based on a maximum of the depth values of the first set of pixels.

This may provide particularly advantageous performance in many scenarios.

In accordance with an optional feature of the invention, the apparatus further comprises a third processor (209) for generating a third processed depth map by processing a plurality of fourth pixels in the second processed depth map in a bottom to top direction; wherein generating a depth value for each fourth pixel of the plurality of fourth pixels in the third processed depth map comprises if a depth step criterion is met setting the depth value in the third processed depth map for the fourth pixel as a depth value of the second processed map for a fifth pixel for the fourth pixel, the fifth pixel being below the fourth pixel, and otherwise setting the depth value in the third processed depth map for the fourth pixel as a depth value for the fourth pixel in the second processed depth map; wherein the depth step criterion is dependent on depth steps both in the input depth map and in the second processed depth map.

This may improve performance in many embodiments and may in particular improve consistency and address potential errors, artefacts or inaccuracies introduced by the first processor but potentially not addressed by the second processor.

In accordance with an optional feature of the invention, the apparatus further comprises a depth offset processor arranged to process pixels of a previously processed depth map, the previously processed depth map being derived from the first processed depth map, the processing comprising modifying a depth value of the previously processed depth map for a given pixel by a value determined in response to a difference between a depth value of the previously processed depth map for the given pixel and a depth value of the input depth map for the given pixel.

This may in many embodiments and scenarios result in an improved depth map. It may in particular for example allow improved consistency of the generated depth map while still allowing some depth texture to remain.

In accordance with an optional feature of the invention, the apparatus further comprises a depth map generator for generating the input depth map in response to depth cues based on motion estimation in a sequence of images of a scene and a predetermined depth profile for the scene.

The approach may provide particularly advantageous performance when processing depth maps generated from different depth cues, such as depth cues based on motion and predetermined depth profiles.

According to an aspect of the invention there is provided a method of processing a depth map, the method comprising: receiving an input depth map; generating a first processed depth map by processing a plurality of first pixels of the input depth map in a bottom to top direction; wherein the processing of each first pixel of the plurality of first pixels comprises determining a depth value for the first pixel for the first processed depth map as the furthest backwards depth value of: a depth value for the first pixel in the input depth map, and a depth value determined in response to depth values in the first processed depth map for a first set of pixels being below the first pixel.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

Figure 1:
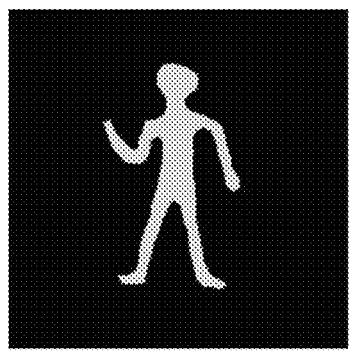
FIG. 1 illustrates examples of depth maps based on different depth cues.
Figure 1:
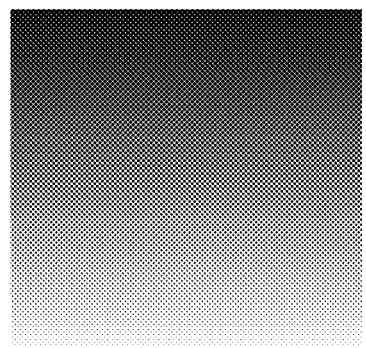
Figure 1:
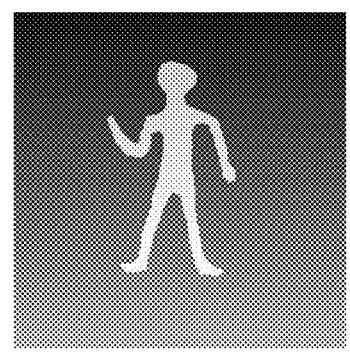

The following description focuses on embodiments of the invention applicable to processing a depth map derived on combining depth cues from a motion based image analysis and depth cues from an (assumed) predetermined depth profile for the scene. However, it will be appreciated that the invention is not limited to this application but may be applied to many other depth maps.

Images representing a scene is today often supplemented by a depth map which provides information of the depth of the image objects in the scene, i.e. it provides additional depth data for the image. Such additional information may allow e.g. view point shifting, 3D representation, etc. thereby providing a number of additional services. The depth map tends to provide a depth value for each of a plurality of pixels, which are typically arranged in an array with a first number of horizontal rows and a second number of vertical columns. The depth values provides depth information for the pixels of the associated image. In many embodiments, the resolution of the depth map may be the same as the resolution of the image, and thus each pixel of the image may have a one-to-one link to one depth value of the depth map. However, in many embodiments, the resolution of the depth map may be lower than that of the image, and in some embodiments a depth value of the depth map may be common for a plurality of pixels of the image (and specifically the depth map pixels may be larger than the image pixels).

The depth values may be any value indicative of a depth, including specifically a depth coordinate value (e.g. directly providing a z-value for the pixel) or a disparity value. In many embodiments, the depth map may be a rectangular array (with rows and columns) of disparity or depth coordinate values.

The accuracy of the representation of the depth of a scene is a key parameter in the resulting quality of images being rendered and perceived by a user. The generation of accurate depth information is accordingly important. For artificial scenes (e.g. a computer game), it may be relatively easy to achieve accurate values but for applications involving e.g. the capture of real world scenes, this may be difficult.

A number of different approaches for estimating depth have been proposed. One approach is to estimate disparity between different images capturing the scene from different viewpoints. However, such a disparity estimation is inherently imperfect. Further, the approach requires the scene to be captured from multiple directions which is often not the case, e.g. for legacy captures. Another option is to perform a motion based depth estimation which exploits that motion of image objects (in a sequence of images) will tend to be higher for objects close to the camera than for objects further away (e.g. for a translating camera, possibly after compensation for the actual motion of the corresponding objects in the scene). A third approach is to exploit predetermined (assumed) information of depth in the scene. For example, for outdoor scenes (and indeed for most typical indoor scenes), objects lower in the image tend to be closer than objects higher in the image (e.g. the floor or ground has increasing distance to the camera for increasing height, the sky tends to be further back than the lower ground etc.). Accordingly, predetermined depth profiles may be used to estimate suitable depth map values.

However, most depth cues tend to be very uncertain and only provide partial information, such as depth order. When a combination of such depth cues is used to produce a depth map, there are often remaining cue conflicts. This problem can be exemplified when for instance combining a motion based depth cue with an assumed global scene shape (e.g. a slanted ground surface) resulting in an estimated predetermined depth profile for the depth map. Typically such cues are combined by a weighted combination of the depth maps of all cues. However, such an approach may often lead to artefacts or inconsistencies between the different depth cues.

For example, a particular problem may be that often a foreground image may appear detached from the background. As a particular example, a moving object (e.g. walking person) may appear to be floating above the ground rather than to be standing on the ground.

Such an inconsistency is exemplified in FIG. 1 wherein image (a) illustrates a possible depth map generated based only on detection of motion. In the example, the movement of the walking person has resulted in the corresponding image object being estimated to be at a given depth whereas the non-moving background is assumed to be at a background depth level (increasing brightness indicates reduced distance to the camera, i.e. the brighter or whiter the pixel, the closer it is to the camera). Image (b) illustrates the depth map corresponding to a predetermined depth profile for the scene. In the example, the predetermined depth profile reflects that the ground is close to the camera at the bottom of the picture and then increasingly increases the distance as the height increases. Such a slanted profile may be typical for many practical real-world scenes.

Image (c) illustrates an example of the combination of the depth maps of image (a) and (b). As can be seen a more representative depth map for an image of a person walking across a slanted depth background is generated. However, as can also be seen, the depth of the walking person stands out from the background, and indeed does so for all parts of the person including the feet. Unfortunately, when rendering an image based on this information, the image will tend to show the person to be disconnected from the background, and indeed may typically result in an appearance of the person floating above the ground rather than standing on the ground.

Figure 2:
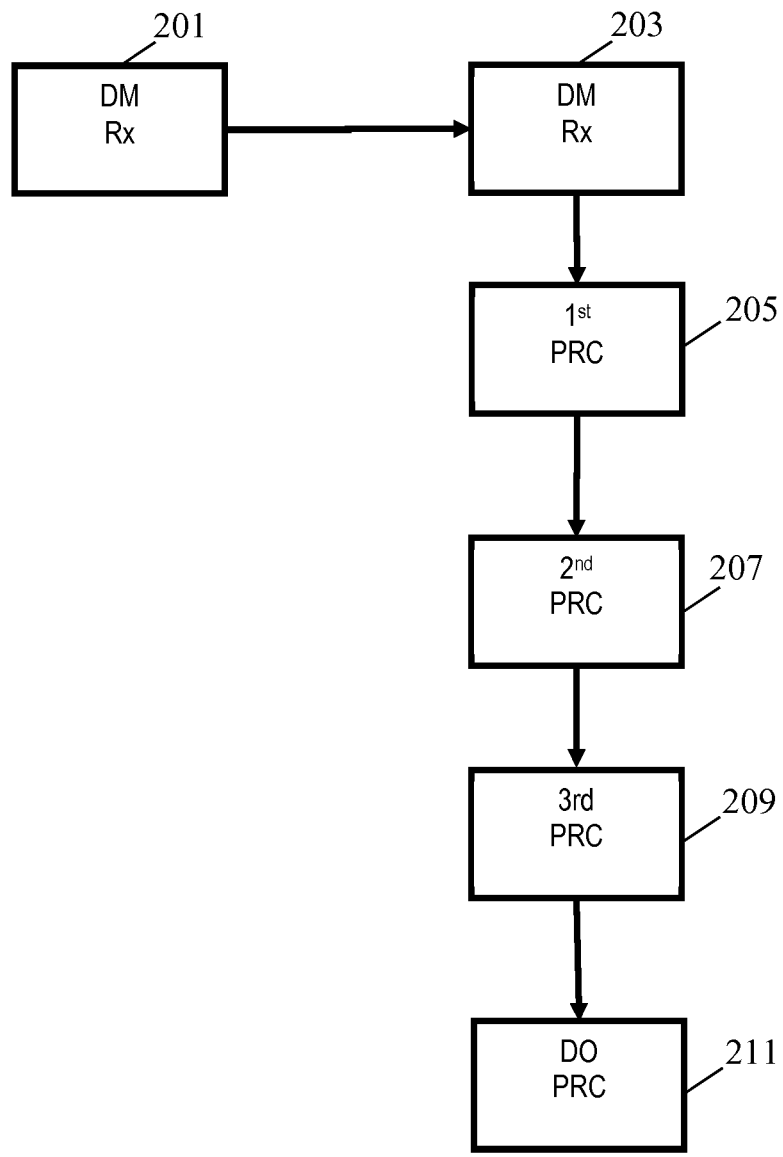
FIG. 2 illustrates an example of elements of an apparatus for processing a depth map in accordance with some embodiments of the invention.

FIG. 2 illustrates some elements of a depth processing apparatus which can process a depth map, and which for many practically occurring situations and applications may address, eliminate, reduce and/or mitigate issues such as those described above. The apparatus may apply a process to a depth map which in many scenarios may improve depth value consistency, and specifically which may improve consistency between different depth cues used to generate a combined depth map.

The approach used by the depth processing apparatus allows for a very efficient and low complexity approach that may be applied as a post-processing to e.g. a depth map estimation process. The approach may reflect a realization that it for many practical scenes and images is statistically far more likely that an object is attached to the ground surface than that it is flying above the ground surface. However, it is not easy to introduce such a depth cue as it is different from other depth estimation cues by not directly corresponding to a depth measure as such but rather relating to the internal consistency of the depth map.

The approach of the apparatus of FIG. 2 may addresses these considerations by processing a depth map based on a bottom-to-top scan while imposing a constraint. However, the processing of the depth map may for some situations and some depth maps introduce some artefacts, inaccuracies, or errors. The depth processing apparatus of FIG. 1 may accordingly in some embodiments be arranged to perform additional optional passes that may address these effects while still keeping the system very efficient.

In more detail, the depth processing apparatus of claim 1 comprises a depth map receiver 201 which in the specific example receives the input depth map to be processed from a depth map generator 203.

In the specific example, the depth map generator 203 is arranged to generate the input depth map by depth estimation from a sequence of images (specifically a video clip with each image corresponding to a frame of the video clip). The depth generation is based on the combination of a motion estimation depth cue and a predetermined depth profile for the scene captured by the images. The input depth map may be a depth map of a sequence of depth maps corresponding to the sequence of images, i.e. to the frames of the video clip.

As an example, the depth map for the motion cue may be generated by taking a per pixel motion vector and subtracting the global (background) motion from it. The depth value is then set to be proportional to the magnitude of this differential motion. Typically, a non-linear function (such as clipping) is used to make sure that fast moving objects don't pop-out too much.

It will be appreciated that in other embodiments, the apparatus may not comprise a depth generator 203 but rather an input depth map may be received e.g. from an external source. It will also be appreciated that whereas the following discussion will focus on a depth map generated from motion based depth cues and predetermined depth profile cues, the approach may also provide advantageous effects for other depth maps, including in many cases depth maps generated based on a single depth cue.

It will be appreciated that different representations of depth by the depth values of the depth maps may be used in different embodiments. For example, in some embodiments, increasing depth values may be indicative of the object being further towards the back/away from the camera/view point (for example a direct z-coordinate value). In other embodiments, increasing depth values may be indicative of the object being further forwards, i.e. further towards the camera/view point (for example a disparity value). For brevity and clarity, the description will assume that the depth values have an increasing value the further forwards (i.e. the closer to the camera/view point) it is. However, it will be appreciated that the described principles and approaches are equally applicable to scenarios where increasing values are indicative of the corresponding objects being further towards the back (further from the camera/view point).

The depth map receiver 201 is coupled to a first processor 205 which is arranged to process the input depth map to generate a depth map, henceforth referred to as the first processed depth map. The first processor 205 is arranged to process the pixels of the input depth map in a bottom to top direction. Thus, in the approach, the pixels are processed in an order from the bottom of the image towards the top of the image.

In the process, the depth values of the input depth map are modified in dependence on depth values of already processed pixels below. Specifically, for a given pixel, referred to as a first pixel, the depth value in the first processed depth map is selected as the furthest backwards depth value of the depth value in the input depth map for the first pixel and a depth value determined from already processed depth values for a set of pixels below the first pixel.

In the approach, a pixel being below another pixel means it is lower in the depth map, i.e. it is closer to the bottom of the depth map and further from the top of the depth map. A pixel being above another pixel means it is higher in the depth map, i.e. it is closer to the top of the depth map and further from the bottom of the depth map. Specifically, the set of pixels being below the first pixel may reflect that they are closer to the bottom of the depth map. Thus, they may belong to a row that is lower/closer to the bottom of the depth map than a row comprising the first depth pixel.

Thus, specifically, for a given first depth map pixel, the first processor 205 may identify a set of pixels which are below the first pixel in the depth map. For example, nine adjacent pixels in the row below the first pixel (and with the center pixel being in the same column as the first pixel) may be selected. The first processor 205 may then proceed to generate a depth value in response to the depth values of this first set of pixels, i.e. a depth value may be generated based on the nine depth values for the selected set. This depth value may be referred to as a constraint depth value. The constraint depth value may for example be generated to have the depth value of the most forward depth value for the first set of pixels. The first processor 205 then proceeds to set the depth value for the first pixel in the first processed depth map to either be the same as the input depth value or the same as the constraint depth value, depending on which one is considered to be the furthest backward. Thus, the first processor 205 selects the furthest backwards depth value of the input depth value and the constraint depth value.

The approach may accordingly process the depth map in a bottom to top direction such that depth values are maintained from the input depth map as long as they are not further forward than a constraint depth value reflecting the processed pixels below. The constraint value may for example be the furthest forward depth value in a small set of pixels immediately below the current pixel value. In this case, the first processed depth map will be set to the same depth value as the input depth map except if this depth value is further forward than the pixels below, in which case it will be replaced by the constraint depth value, i.e. it will be replaced by the furthest forward of the small set of pixels immediately below. The effect will substantially be that the depth information of the input depth map will be retained in the first processed depth map except for pixels where this will result in the image objects/pixels that are further forward than lower pixels, in which case the pixel will be moved back to be at the same level as the pixels below.

Further, as the process is performed in a bottom to top direction, such modification of pixels in order to remove (or at least reduce) forward depth steps will propagate upwards in the depth map thereby effectively moving objects that stand out (forward) back in the image to be consistent with image objects/pixels below it. The process allows a very low complexity approach to be used where pixels can be processed sequentially and based on simple comparisons/processes yet achieve an effective depth adjustment resulting in a much more consistent depth map being generated.

As a specific example, in a bottom-to-top scan the depth value for pixel (i, j) (row, column) may be selectively modified to bias objects with a smaller y-coordinate (larger row i-coordinate, closer to the bottom) to not be further back than objects with a larger y-coordinate (smaller row i-coordinate, closer to the top). For example, the processing for each pixel (i, j) may be given by:

$$D_{i,j}' \leftarrow \min(D_{i,j}, \max(D_{i+1,j-\Delta}, \ldots, D_{i+1,j+\Delta}))$$

where $D_{x,y}$ is the depth value in the input depth map for (depth map) pixel at row x and column y with an increasing depth value being indicative of the pixel being further forward, $D'_{x,y}$ is the corresponding depth value in the first processed depth map, and $\Delta$ is a design parameter defining the size of the first set of pixels. Typical values for $\Delta$ is in the range from 3-10.

Figure 3:
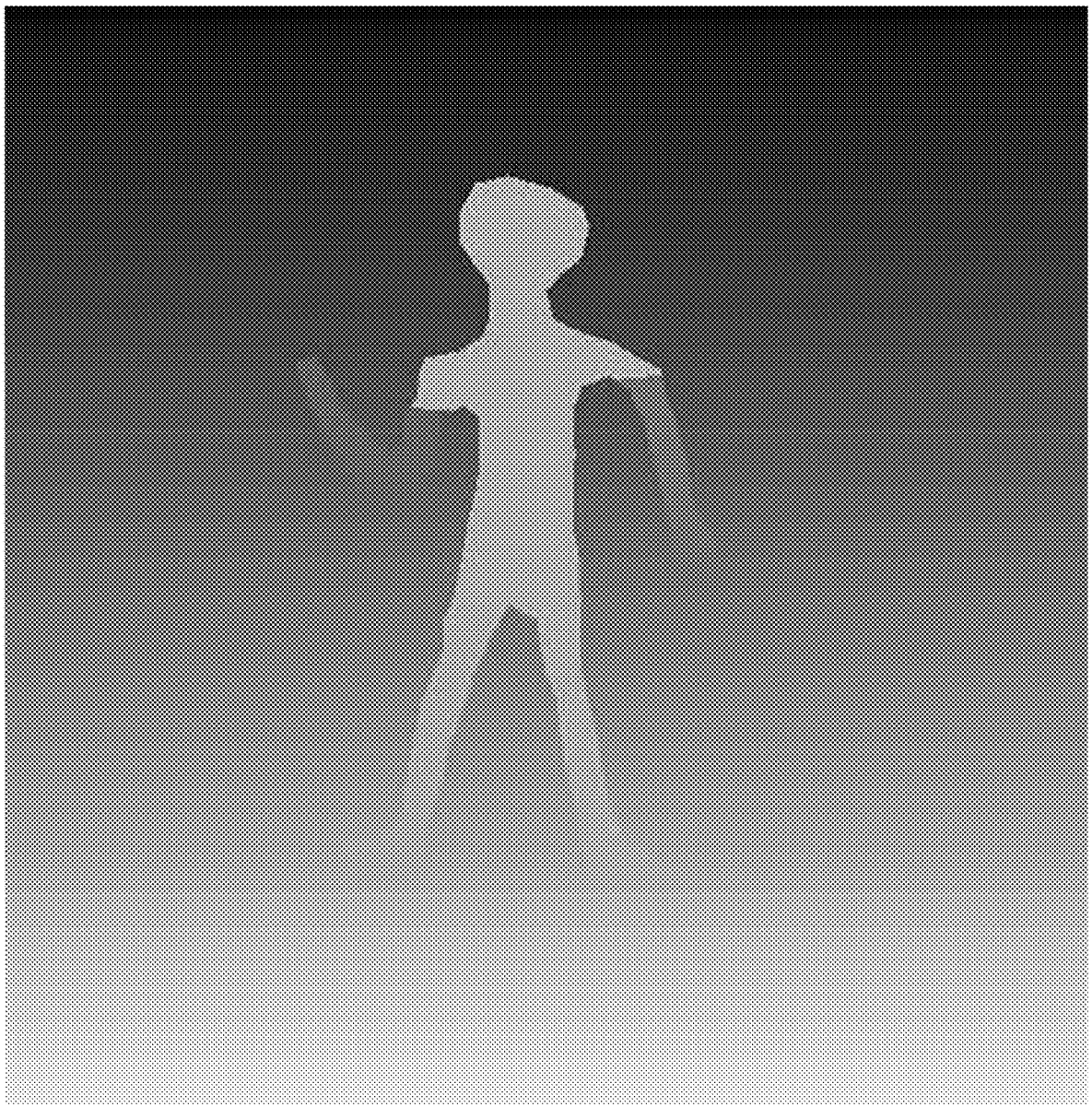
FIG. 3 illustrates an example of a depth map generated by the apparatus of FIG. 2.

An example, of the result of applying this post-processing operation on the depth map of FIG. 1c is shown in FIG. 3. As can be seen, a much more consistent depth map is achieved and the step discontinuities around areas having depth determined from different depth cues have been reduced. Further, in the processed depth map, the walking person has been moved back in the image so that he (or rather the bottom of his feet) does not stand-out (forward) from the background. The effect when an image is rendered on the basis of the processed depth map is that the walking person no longer appears to be floating over (and in front of) the ground. Rather, the person will appear to be standing/walking on the ground and a much more realistic scene will be rendered.

This may provide for a low complexity approach which in practice tends to provide results that are perceived to be more realistic. The approach is of very low complexity and may possibly introduce some errors or artefacts. For example, objects such as flying birds may be moved further back in the image resulting in the original depth not being retained. Also, the low complexity approach may introduce new errors to image objects of some shapes, such as e.g. can be seen for the arms of the walking person in FIGS. 1 and 3. Therefore, intuitively it would be expected that the low complexity bottom to top processing and constraint requirements is not suitable for improving the depth map. However, the Inventors have realized that in practice, the approach provides improved performance in many practical applications despite the potential for such errors. For example, the benefit of a person appearing to be standing on the ground rather than floating above will outweigh the effect of some birds potentially being moved further back.

It will be appreciated that the exact selection of pixels for the first set of pixels will depend on the preferences and requirements of the individual embodiment. In most embodiments, the first set of pixels will comprise or consist of pixels of a next lower row for the first pixel. Specifically, as in the above example, the first set of pixels may be selected to include a number of pixels in the row immediately below the row of the current pixel.

It will also be appreciated that in many embodiments, a relatively low number of pixels will be included in the first set, and in many embodiments, the number of pixels in the first set may not exceed 20 pixels. Such an approach may reduce complexity and allow a computationally very efficient operation.

Thus, the approach may in most embodiments be based on a very localized depth constraint and the input depth map may be processed based on only local considerations yet provide a global effect.

The first set of pixels comprising a number of pixels, such as a number of pixels in the row below the current pixel, may also provide advantageous effects. In some embodiments, it may provide an averaging effect by considering a small area rather than a single pixel. Further, it may in many embodiments also provide an improved depth adjustment which for example allows depth of objects of different shapes to not only propagate in a vertical direction but also in a horizontal direction.

Figure 4:
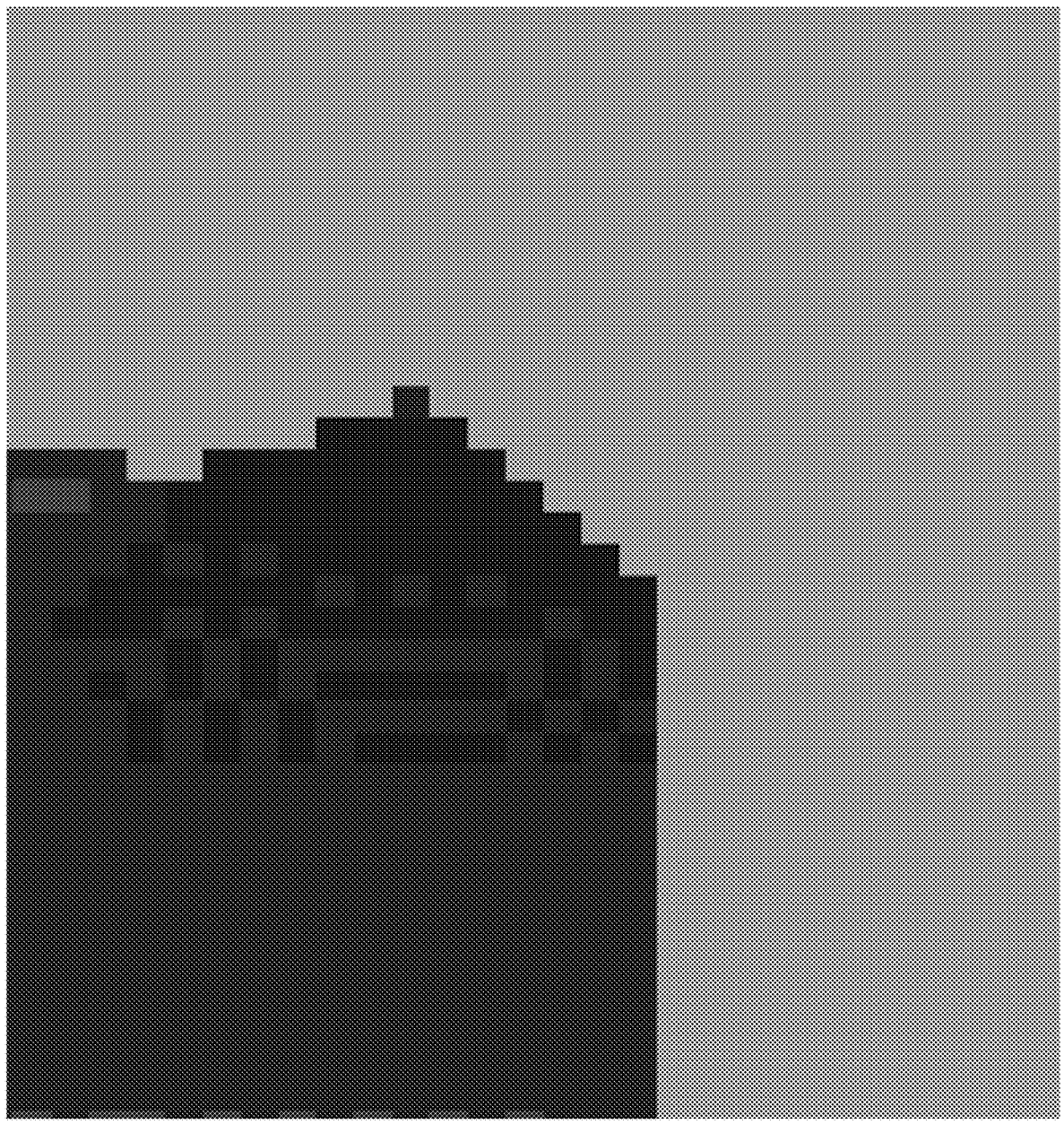
FIG. 4 illustrates a close-up of elements of the depth map of FIG. 3.

For example, FIG. 4 illustrates the left side armpit area of the person in FIG. 3. As can be seen, in the bottom to top processing, the depth values of the person propagates vertically upwards since the constraint depth value for a given pixel is at least that of the pixel below. However, for a lowest pixel of the arm, the pixel immediately below is part of the background and therefore the arm pixel would be constrained to the background depth value if the first pixel set only included the pixel vertically below. However, by extending the first set of pixels horizontally, the depth values from the lower row can propagate sideways, e.g. the depth from the body pixels of FIG. 4 propagate into the arm area.

It will be appreciated that the selection of the first set of pixels may be different in different embodiments and may e.g. to be selected to provide a desired trade-off between the vertical constraints imposed and a desired sideways depth propagation. The trade-off may in some embodiments vary between individual images or frames, and indeed in some embodiments a rule or algorithm for selecting the first set of pixels may be dynamically changed between different frames.

The approach is based on the pixels of the first processed depth map being processed in a bottom to top direction. Thus, a given pixel is only processed after the pixels in the first set of pixels (for that given pixel) have already been processed where the pixels in the first set are below the given pixel (they have a higher row number for rows being numbered from the top to the bottom in the depth maps).

In many embodiments, a given pixel in the input depth map will only be processed after the pixel immediately below that pixel has been processed. In many embodiments, pixels of a given row will only be processed after all pixels in the row below it have already been processed, and indeed typically only after all pixels in all rows below it have already been processed.

However, it will be appreciated that the processing of pixels does not need to be strictly sequential in either the vertical or horizontal direction. Rather, the processing of a given pixel requires only that the pixels of the first set of pixels for that given pixel have already been processed. Thus, it may be possible in some embodiments, that e.g. the processing starts in the bottom left (or right) corner and then propagates towards the top and right (or left) as pixels become available for processing due to the corresponding pixels in the first set having been processed.

It will also be appreciated that the process need not include all pixels in the depth map. For example, in some embodiments, the approach may only be applied to pixels within a given region of the depth map corresponding to a given region of the image. Also, in many embodiments, the specific approach may only be iterated over pixels for which a first set of pixels can be successfully selected. For example, in many embodiments, the bottom row is not processed in the specific way but rather the process is applied to the pixels of the second lowest row with the first set of pixels being generated using the pixels of the bottom row. In other embodiments, default depth values may be used. For example, a "virtual" or "pseudo" row (or in some embodiments rows) of depth values may be generated and used as a row below the bottom row of the depth map for the purposes of processing the pixels of the bottom row. The depth values of this "virtual" row may e.g. simply be initialized as default or predetermined values (e.g. corresponding to the most forward possible depth value) or may e.g. be determined from depth values of the bottom row, such as a furthest forward depth value.

The determination of the constraint depth value from the depth values of the pixels in the first set of pixels may be based on different functions or algorithms in different embodiments. The constraint depth value may for example be determined based on one or more of the following:

A maximum forward value of the depth values of the first set of pixels. This may result in the constraint depth value reflecting that the furthest forward value is most important to propagate. An advantage of this function for determining the constraint depth value is that an object is put straight-up.

A mean value of the depth values of the first set of pixels. This may result in the constraint depth value reflecting the mean depth or an object. An advantage of this function for determining the constraint depth value is that it is less sensitive to noise.

A median value of the depth values of the first set of pixels. This may result in the constraint depth value reflecting the median depth or an object below. An advantage of this function for determining the constraint depth value is that it is less sensitive to noise while not taking the mean.

As mentioned previously, the processing by the first processor 205 is computationally highly efficient and tends to result in more consistent and advantageous depth maps. However, as also mentioned, it may in some scenarios introduce errors for some shapes and images/depth maps. For example, as shown in FIG. 3, depth errors/artefacts may be introduced to the arms of the walking person. In many embodiments, such effects may be relatively unlikely and/or considered acceptable. For example, they tend to occur more often for irregular foreground shapes and in scenarios wherein such objects are unlikely, the processing by the first processor 205 may be sufficient.

However, in other embodiments, the first processor 205 is coupled to a second processor 207 which is arranged to further process the first processed depth map to seek to reduce or mitigate the effect of such errors and artefacts.

The second processor 207 receives the first processed depth map and generates a second processed depth map by processing pixels in the first processed depth map in a top to bottom direction. The second processor 207 may thus perform a similar iterative or sequential process but does so in the opposite direction of processing by the first processor 205. The first processor 205 may thus be seen as performing a first pass, with the second processor 207 performing a second pass seeking to address potential errors or artefacts that may have resulted from the first pass.

The second processor 207 is arranged to process the first processed depth map by setting the depth map value of the second processed depth map as either the corresponding pixel in the first processed depth map or as a depth value for a pixel of the first processed depth map which is above the current pixel. Thus, the depth value in the second processed depth map may be set as the depth value for the corresponding depth value for the pixel in the first processed depth map or it may be set to a depth value in the first processed depth map of a pixel above the current pixel. The selection of which depth value to use is based on a depth step criterion which considers both the input depth map and the first processed depth map.

In more detail, for a given pixel, referred to as the second pixel, the second processor 207 determines a depth value $D_{i,j}"$ in the second processed depth map. One candidate for this depth value $D_{i,j}"$ is the corresponding depth value $D_{i,j}'$ in the first processed depth map. This depth value may be referred to as the first candidate depth value $D_{i,j}'$ and if this is selected it corresponds to the depth value for the second pixel not being changed.

Alternatively, the depth value $D_{i,j}"$ in the second processed depth map may be set to the depth value of the first processed map for a third pixel which is above the second pixel. This depth value may be referred to as a second candidate depth value $D_{i-1,k}'$. In many embodiments, the third pixel/the second candidate depth value may be selected from a, typically small, set of pixels above the second pixel. For example, the second candidate depth value $D_{i-1,k}'$ may be selected from a set of pixels with k in the interval of [j−N;j+N], where N is typically a small number, e.g. N may be in the interval from 1 to 7.

The approach by the second processor 207 thus processes the first processed depth map in a top to bottom direction and either maintains the depth value of the first processed depth map ($D_{i,j}" \leftarrow D_{i,j}'$) or allows the depth value to be one propagating down from pixels above the current pixels ($D_{i,j}" \leftarrow D_{i-1,k}'$).

The choice of whether to maintain the depth value or to replace it is as previously mentioned based on a depth step criterion which is dependent on depth steps both in the input depth map and in the first processed depth map.

Specifically, the depth step criterion may require that the absolute value of a depth step in the input depth map is not above a first threshold and that a backwards depth step in the first processed image is not below a second threshold.

In such an embodiment, the first processed depth map may accordingly be substituted by a depth value from a pixel above if the second processor 207 detects that there is only a small depth step in the input depth map but that there is a large backwards depth step in the first processed depth map (when moving to the current pixel). In this case, the large depth step in the first processed depth map may indicate that the first processor 205 has introduced a depth transition which is not there in the original input depth map. Accordingly, the second processor 207 allows the depth value which is further forward to propagate from the third pixel to the current pixel (the second pixel).

More specifically, the depth step criterion may comprise a requirement that an absolute depth step in the input depth map between the third pixel and a pixel above the second pixel is not above a third threshold ($|D_{i-1,k}-D_{i-1,j}| \leq t_3$) and/or that a maximum absolute depth step in the input image between the second pixel and a pixel above the second pixel is not above a fourth threshold ($|D_{i-1,j}-D_{i,j}| \leq t_4$). These requirements may provide advantageous indications that there are no corresponding depth steps in the input image in either the horizontal or vertical direction with respect to the current pixel (the second pixel) and the target pixel (the third pixel). Accordingly, these requirements provide a good indication that the original depth map had no local depth transitions/steps/discontinuities and that therefore any such local transitions/steps/discontinuities is likely to have been introduced by the processing of the first processor 205.

The depth step criterion may in many embodiments comprise a requirement that a (size of a) backwards depth step in the first processed image from the third pixel to the second pixel is not below a fifth threshold, i.e. that stepping to the current pixels results in a sufficiently large depth step away from the camera/view point. In embodiments where an increasing depth value D is indicative of the pixel being closer to the camera/view point, this can be expressed by ($D_{i,k}'-D_{i-1,j}' \leq t_5$). This may provide a suitable indication that a backwards depth step, which may potentially have been incurred by the processing of the second processor 207, is present.

As a specific example, the second processor 207 may perform the following algorithm:

```
1.      D"_{i,j} ← D'_{i,j}
2.      for row i ← 2 ... N_{rows}
3.        for column j ← 2 ... N_{cols}-1
4.          for column k ← j − 1, ...j + 1
5.            D_{steppath} ← max(|D_{i-1,k} − D_{i-1,j}|, |D_{i-1,j} − D_{i,j}|)
6.            if D_{steppath} < t_3 and D'_{i,j} − D'_{i-1,k} < t_5
7.              D"_{i,j} ← D'_{i-1,k}
```

In this example, line 4 of the exemplary algorithm evaluates the maximum change in depth (in the original input depth map) along three separate 4-connected paths from a pixel in a previous row to the current pixel in the current row. Only if the absolute change in depth is below a threshold ($D_{steppath} < t_1$) and the already processed depth map still contains a significant backwards step ($D_{i,j}' - D_{i-1,k}' < t_5$ (where it is noted that increasing values are indicative of the pixel being further forward and that accordingly a backwards step corresponds to a negative difference)), thus indicating that an error was introduced by the second processor 207, then the depth is propagated.

Figure 5:
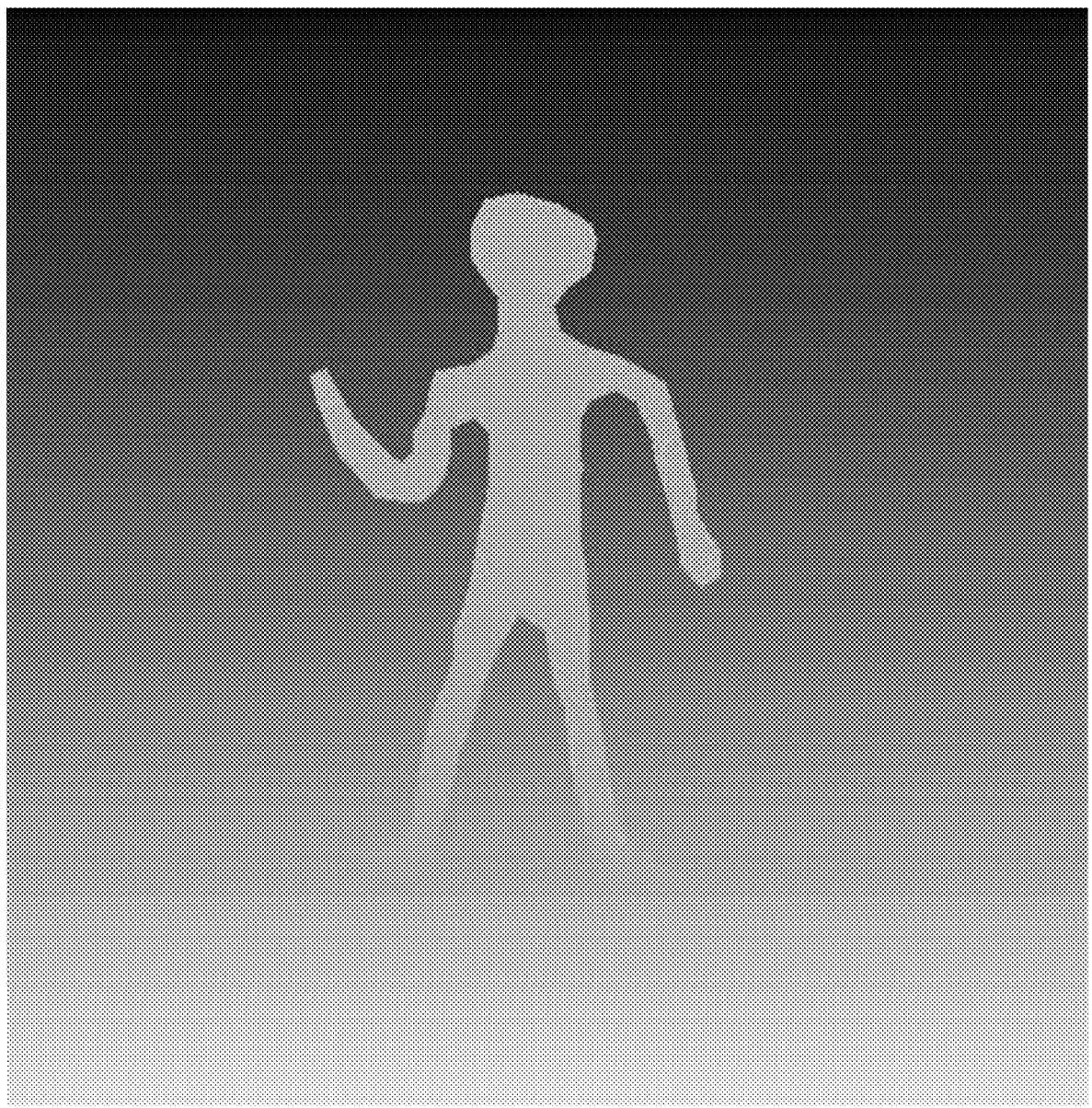
FIG. 5 illustrates an example of a depth map generated by the apparatus of FIG. 2.

FIG. 5 illustrates the result of applying this algorithm to the first processed depth map of FIGS. 3 and 4. As can be seen, the depth of one arm and most of the other has been restored to the same depth level as the rest of the person without affecting the body of the person, and in particular without affecting the consistency between the feet of the person and the background.

It will be appreciated that the different thresholds for the requirements may depend on the requirements and preferences of the individual embodiment. It will also be appreciated that in some embodiments, the thresholds may be dynamic and/or dependent on other parameters or properties.

The third pixel may be selected from a second set of pixels that are above the second pixel. Typically the second set of pixels may be a small number of pixels in the row immediately above the second pixel. For example, the second set of pixels may be a set of between 1 to 15 pixels in the row immediately above the row of the second pixel. Typically, the second set of pixels may be substantially horizontally symmetric with respect to the second pixel. The use of a relatively low number of pixels as candidates for being the source of a depth propagation may in many embodiments and scenarios result in a sufficiently strong compensation while maintaining the effect sufficiently low to maintain a low risk that this introduces additional effects.

It will also be appreciated that the process performed by the second processor 207 need not include all pixels in the depth map. For example, in some embodiments, the approach may only be applied to pixels within a given region of the depth map corresponding to a given region of the image. Also, in many embodiments, the specific approach may only be iterated over pixels for which valid pixels above the current pixel can be selected. For example, as illustrated by the pseudo code above, in many embodiments, the top row is not processed in the described way but rather the process is applied starting from the second highest row. In other embodiments, default depth values may be used, e.g. by adding a "virtual" row of default depth values above the top row.

As can be seen in FIG. 5, the second processor 207 results in an improved depth map in which a number of the errors and artefacts introduced by the first processor 205 may have been compensated. However, as can be seen, the approach may not address all introduced artefacts. For example, the upwards section of the arm on the left side of the picture has not been compensated.

In the system of FIG. 2, the second processor 207 is coupled to a third processor 209 which is fed the second processed depth map and which in response generates a third processed depth map. The third processor 209 essentially performs a symmetric operation to that of the second processor 207 but in a bottom-to-top direction.

The third processor 209 may thus receive the second processed depth map and generate a third processed depth map by processing pixels in the second processed depth map in a bottom to top direction. The third processor 209 may thus perform a similar iterative or sequential process as the second processor 207 but does so in the opposite direction. The third processor 209 may thus be considered to perform a third pass seeking to address potential errors or artefacts that may have resulted from specifically the first pass.

The third processor 209 is arranged to process the second processed depth map by setting the depth map value of the third processed depth map as either the corresponding pixel in the second processed depth map or as a depth value for a pixel of the second processed depth map which is below the current pixel. Thus, the depth value in the third processed depth map may be set as the depth value for the corresponding depth value for the pixel in the second processed depth map or to a depth value in the second processed depth map of pixel above the current pixel. The selection of which depth value to use is again based on a depth step criterion which considers both the input depth map and the first processed depth map.

In more detail, for a given pixel, referred to as the fourth pixel, the third processor 209 determines a depth value $D_{i,j}'''$ in the third processed depth map. One candidate for this depth value $D_{i,j}'''$ is the corresponding depth value $D_{i,j}''$ in the second processed depth map. This depth value may be referred to as the third candidate depth value $D_{i,j}''$.

Alternatively, the depth value $D_{i,j}'''$ in the third processed depth map may be set to the depth value of the second processed map for a fifth pixel which is below the second pixel. This depth value may be referred to as a fourth candidate depth value $D_{i+1,k}''$. In many embodiments, the fifth pixel/the fourth candidate depth value may be selected from a, typically small, set of pixels above the fourth pixel. For example, the fourth candidate depth value $D_{i+1,k}''$ may be selected from a set of pixels with k in the interval of [j−N;j+N] where N is typically a small number, e.g. N may be in the interval from 1 to 7.

The approach by the third processor 209 thus processes the second processed depth map in a bottom to top direction and either maintains the depth value of the second processed depth map ($D_{i,j}''' \leftarrow D_{i,j}''$) or allows the depth value to be propagating up from pixels below the current pixels ($D_{i,j}''' \leftarrow D_{i+1,k}''$).

The choice of whether to maintain the depth value or to replace it is as previously mentioned based on a depth step criterion which is dependent on depth steps both in the input depth map and in the second processed depth map.

Specifically, the depth step criterion may require that the absolute value of a depth step in the input depth map is not above a first threshold and that a backwards depth step in the second processed image is not below a second threshold.

In such an embodiment, the second processed depth map may accordingly be substituted by a depth value from a pixel above if the third processor 209 detects that there is only a small depth step in the input depth map but that there is a large backwards depth step in the second processed depth map (when moving to the current pixel). In this case, the large depth step in the second processed depth map may indicate that the first processor 205 has introduced a depth transition which is not there in the original input depth map. Accordingly, the third processor 209 allows the further forward depth value to propagate from the fifth pixel to the current pixel (the fourth pixel).

More specifically, the depth step criterion may comprise a requirement that an absolute depth step in the input depth map between the fifth pixel and a pixel below the fourth pixel is not above a sixth threshold ($|D_{i+1,k} - D_{i+1,j}| \leq t_6$) and/or that a maximum absolute depth step in the input image between the fourth pixel and a pixel above the fourth pixel is not above a seventh threshold ($|D_{i+1,j}-D_{i,j}| \le t_7$). These requirements may provide advantageous indications that there are no corresponding depth steps in the input image in either the horizontal or vertical direction with respect to the current pixel (the fourth pixel) and the target pixel (the fifth pixel). Accordingly, these requirements provide a good indication that the original depth map had no local depth transitions/steps/discontinuities and that therefore any such local transitions/steps/discontinuities may have been introduced by the processing by the first processor 205.

The depth step criterion may in many embodiment comprise a requirement that a (size of a) backwards depth step in the second processed image from the fifth pixel to the fourth pixel is not below an eighth threshold, i.e. that stepping to the current pixels results in a sufficiently large depth step away from the camera/view point. In embodiments where an increasing depth value D is indicative of the pixel being closer to the camera/view point, this can be expressed by ($D_{i,j}''-D_{i+1,k}'' < t_8$). This may provide a suitable indication that a backwards depth step, which may potentially have been incurred by the processing of the first processor 205, is present.

As a specific example, the third processor 209 may perform the following algorithm:

```
1.    D'''_{i,j} ← D''_{i,j}
2.    for row i ← N_{rows} - 1 ... 1
3.        for column j ← 2 ... N_{cols}-1
4.            for column k ← j - 1, ...,j + 1
5.                D_{steppath} ← max(|D_{i+1,k} - D_{i+1,j}|, |D_{i+1,j} - D_{i,j}|)
6.                if D_{steppath} < t_6 and D''_{i,j} - D''_{i+1,k} < t_8
7.                    D'''_{i,j} ← D''_{i+1,k}
```

It will be appreciated that the other comments, examples, etc provided with respect to the processing by the second processor 207 equally apply to the processing by the third processor 209, mutatis mutandis.

Figure 6:
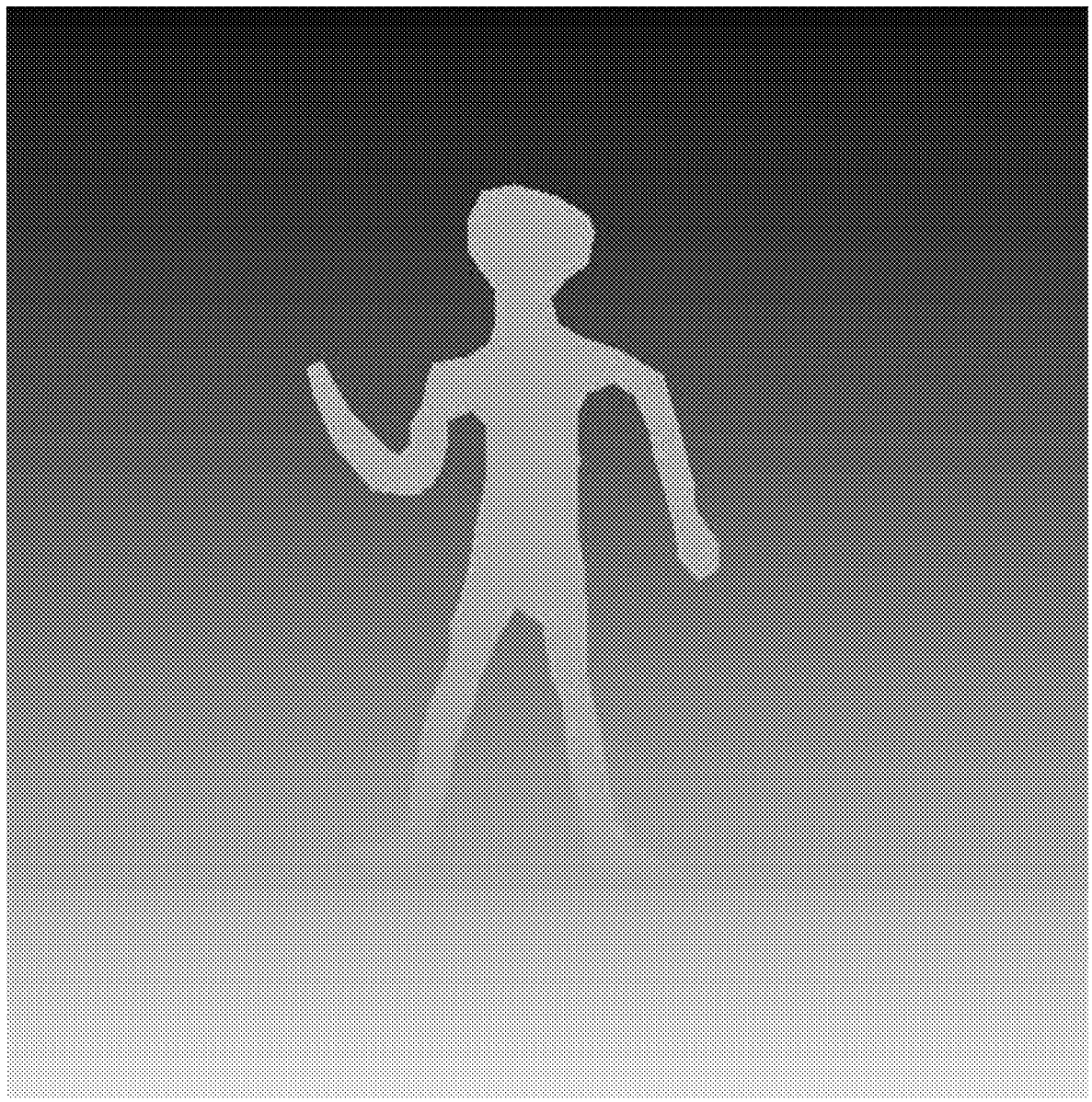
FIG. 6 illustrates an example of a depth map generated by the apparatus of FIG. 2.

FIG. 6 illustrates the result of applying this algorithm to the second processed depth map of FIG. 5. As can be seen, the depth of the arm on the left side of the image has now been restored to the same depth level as the rest of the person without affecting the body of the person, and in particular without affecting the consistency between the feet of the person and the background.

It will again be appreciated that the approach may only be applied to appropriate pixels for which valid neighbor pixels can be found. In general, it will be appreciated that the processes can be limited to only be applied to some pixels and that specifically the specific approach for calculating or modifying a depth value may only be applied to pixels for which the other required neighbor depth values are available.

In some embodiments, the depth processing apparatus of FIG. 2 may further comprise a depth offset processor 211 which may process a depth map that has been processed by the first processor 205 and optionally also by the second processor 207 and/or the third processor 209 to generate an offset depth map in which some depth values may be offset to restore some of the forward depth step that has been reduced by the previous processing. Thus, the depth map processed by the depth offset processor 211 may be an already processed depth map which is derived from the first processed depth map, i.e. the process by the first processor 205 has been part of the process resulting in the depth map. Accordingly, the first processed depth map has been derived from the first processed depth map, e.g. by the processing by the second processor 207 and/or the third processor 209. It will be appreciated that the derived depth map includes the straightforward derivation of simply using the first processed depth map without changing this, i.e. the already processed depth map being fed to the depth offset processor 211 may be the first processed depth map itself in some embodiments.

Figure 7:
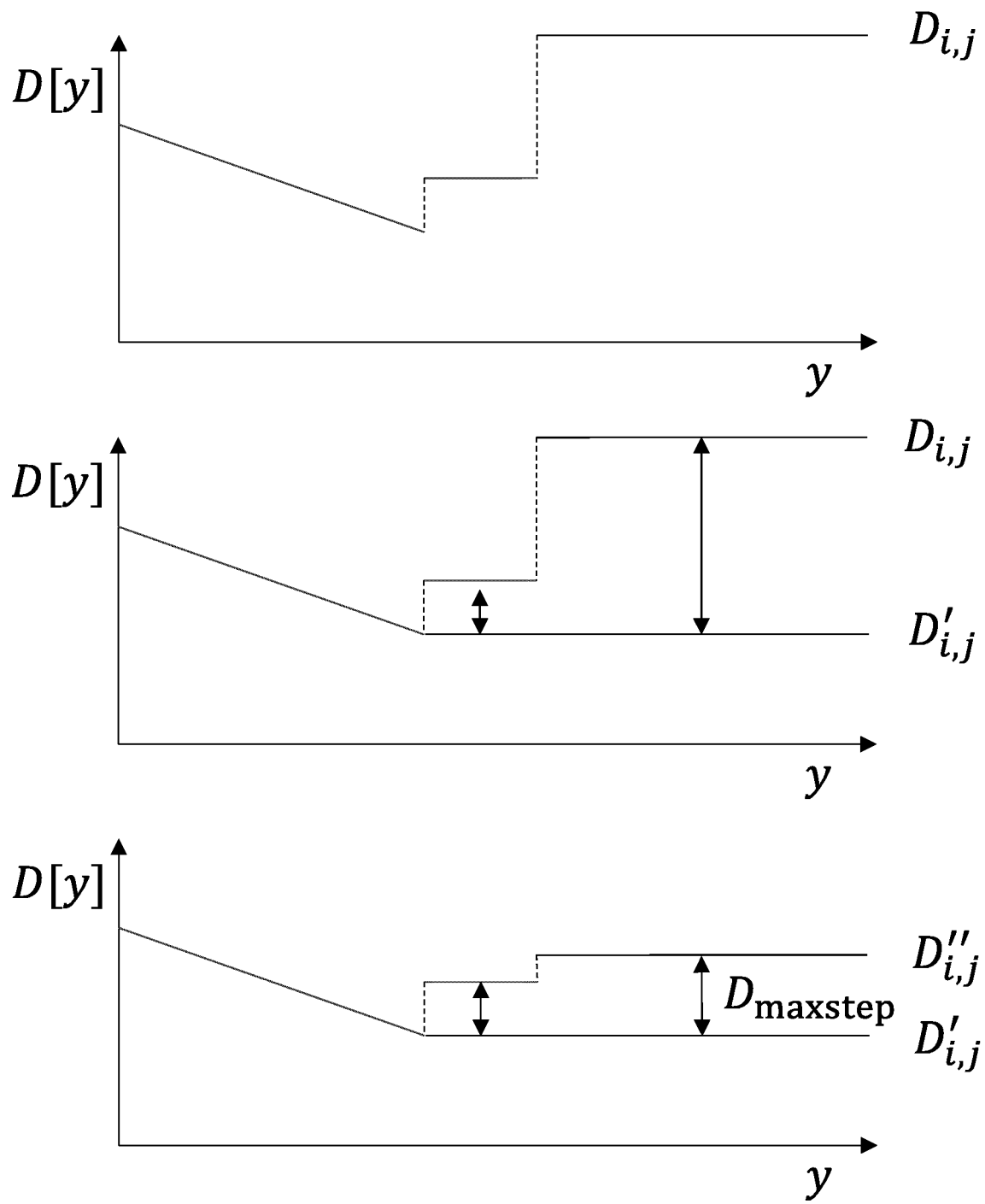
FIG. 7 illustrates examples of a depth profiles of depth maps of the apparatus of FIG. 2.

An example of the approach of the depth offset processor 211 may be elucidated with reference to FIG. 7 which first shows a possible depth profile $D_{i,j}$ for a column in the input depth map (with increasing y values corresponding to higher rows in the image (i.e. y increases towards the top). The next profile shows the resulting depth profile $D_{i,j}'$ of first processed depth map generated by the first processor 205. As can be seen, no forwards depth steps for increasing y values are allowed and thus the depth values are decreased where such depth steps occur.

The lowest chart of FIG. 7 illustrates a possible resulting depth profile $D_{i,j}''$ after an exemplary depth processing by the depth offset processor 211. In the example, some of the forward depth steps have been re-introduced. Specifically, in the example, the original depth values, and thus depth steps, have been reinstated subject to a maximum depth step value $D_{maxstep}$. Specifically, the depth offset processor 211 may perform the following operation:

```
1.    for row i ← 1 ... N_{rows}
2.        for column j ← 1 ... N_{cols}-1
3.            D''_{i,j} ← D'_{i,j} + min(D_{i,j} - D'_{i,j}, D_{maxstep})
``` where $D_{i,j}$ is the depth value of the original input depth map and $D_{i,j}'$ is the result of processing by the first processor 205 (and optionally the second processor 207 and third processor 209). $D_{i,j}''$ is the final output of the depth offset processor 211. Parameter $D_{maxstep}$ is the maximum allowed depth difference (typically set to e.g. 5 for a depth map with dynamic range of 0 . . . 255).

Thus, in this approach, some, typically small, forward depth steps are allowed/reintroduced. This approach may in many scenarios result in improved perceived quality. For example, it may introduce some depth texture and variation in image objects (thereby e.g. preventing or mitigating a flat/cardboard look of e.g. the moving person) while still ensuring that these are perceived to not stand-out/float over e.g. the ground.

The depth offset processor 211 may accordingly offset the depth values of the received depth map (which may e.g. be received from any of the first processor 205, the second processor 207, or the third processor 209 depending on the specific embodiment). The offset for a given pixel may be determined based on the difference between the depth value for this pixel in respectfully the received processed depth map and the original input depth map.

In some embodiments, such as described above, the offset may simply be equal to the difference between these, subject to a maximum value (and thus the depth offset processor 211 restores the input depth value as long as the relative depth step does not exceed the maximum value at which level the value is clipped).

In some embodiments, the offset may be scaled by a scale factor less than 1 prior to the comparison to the maximum value. Thus, the depth variations may be scaled down while allowing a higher range to be represented.

Figure 8:
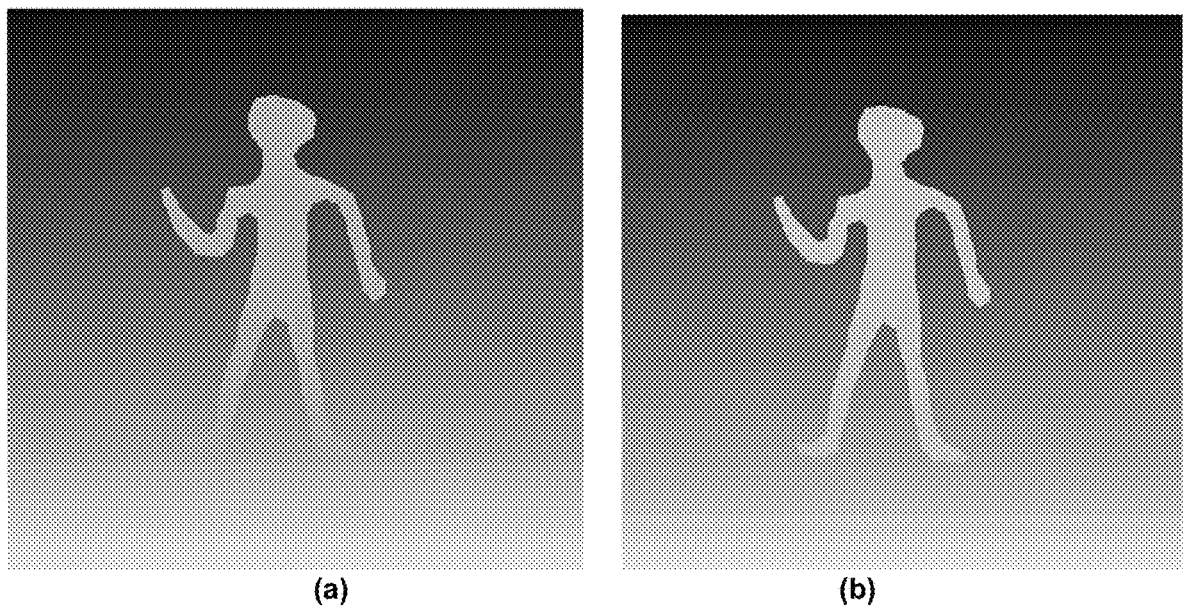
FIG. 8 illustrates examples of depth maps of the apparatus of FIG. 2.

The effect of the post-processing by the first processor 205 (and optionally the second processor 207 and the third processor 209) may provide a more naturally looking 3D viewing experience but at the cost of a potentially significantly reduced perceived depth effect. By still allowing a relatively small depth step (up to $D_{maxstep}$), it is possible to obtain a perceptually more natural 3D behavior combined with a minimal loss of 3D depth perception. FIG. 8 illustrates an example of a depth map (a) being fed to the depth offset processor 211 and a corresponding output depth map (b) generated by the depth offset processor 211.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An apparatus for processing a depth map, comprising:
   a receiver circuit, wherein the receiver circuit is arranged to receive an input depth map;
   a processor circuit, wherein the processor circuit is arranged to generate a first processed depth map by determining a depth value for each of a plurality of first processed pixels in a bottom to top direction;
   wherein the processing of each pixel of the plurality of first processed pixels comprises: obtaining a first depth value of the pixel in the input depth map,
      determining a second depth value based on depth values in the first processed depth map for a set of lower pixels that are below the pixel in the first processed depth map, and
      if the first depth value is farther back than the second depth value, setting the depth value of the pixel in the first processed depth map to the first depth value; and
      if the second depth value is farther back than the first depth value, setting the depth value of the pixel in the first processed depth map to the second depth value.

2. The apparatus of claim 1, wherein the set of lower pixels comprises pixels of a row immediately below a row of the pixel in the first processed depth map.

3. The apparatus of claim 1, wherein the set of lower pixels comprises no more than 20 pixels.

4. The apparatus of claim 1, further comprising a second processor circuit,
   wherein the second processor circuit is arranged to generate a second processed depth map by determining a depth value for each of a plurality of second pixels in the second processed depth map in a top to bottom direction;
   wherein determining the depth value for each second pixel in the second processed depth map comprises:
      determining a third depth value based on a depth value in the first processed depth map for a third pixel that is above the second pixel in the first processed depth map,
      obtaining a fourth depth value of the second pixel in the first processed depth map,
      if a depth step criterion is met, setting the depth value of the second pixel in the second processed depth map to the third depth value, and
      if the depth step criterion is not met, setting the depth value of the second pixel in the second processed depth map to the fourth depth value,
   wherein the depth step criterion is dependent on depth steps both in the input depth map and in the first processed depth map.

5. The apparatus of claim 4, wherein the depth step criterion requires that an absolute value of a depth step in the input depth map is not above a first threshold and that a backwards depth step in the first processed image is not below a second threshold.

6. The apparatus of claim 4, wherein the depth step criterion comprises a requirement that an absolute value of a depth step in the input depth map between the third pixel and a pixel above the second pixel is not above a third threshold.

7. The apparatus of claim 4, wherein the depth step criterion comprises a requirement that a maximum absolute depth step in the input image between the second pixel and a pixel above the second pixel is not above a fourth threshold.

8. The apparatus of claim 4, wherein the depth step criterion comprises a requirement that a backwards depth step in the first processed image from the third pixel to the second pixel is not below a fifth threshold.

9. The apparatus of claim 4, wherein the second processor circuit is arranged to select the third pixel from a second set of pixels comprised in a row immediately above a row of the second pixel.

10. The apparatus of claim 4, further comprising a third processor circuit,
wherein the third processor circuit is arranged to generate a third processed depth map by processing a plurality of fourth pixels in the second processed depth map in a bottom to top direction,
wherein generating a depth value for each fourth pixel of the plurality of fourth pixels in the third processed depth map comprises:
determining a fifth depth value based on a depth value in the second processed depth map for a fifth pixel that is below the fourth pixel in the second processed depth map,
obtaining a sixth depth value of the fourth pixel in the second processed depth map, and
if a second depth step criterion is met, setting the depth value of the fourth pixel in the third processed depth map to the fifth depth value; and
if the second depth step criterion is not met, setting the depth value of the fourth pixel in the third processed depth map to the sixth depth value,
wherein the second depth step criterion is dependent on depth steps both in the input depth map and in the second processed depth map.

11. The apparatus of claim 1, wherein the first processor circuit is arranged to determine the depth value of the first processed depth map for the first pixel based on a maximum of the depth values of the first set of pixels.

12. The apparatus of claim 1, further comprising a depth offset processor circuit,
wherein the depth processor circuit is arranged to process pixels of a previously processed depth map,
wherein the previously processed depth map is derived from the first processed depth map,
wherein the processing comprises modifying a depth value of the previously processed depth map for a given pixel by a value determined in response to a difference between a depth value of the previously processed depth map for the given pixel and a depth value of the input depth map for the given pixel.

13. The apparatus of claim 1, further comprising a depth map generator, wherein the depth map generator is arranged to generate the input depth map in response to depth cues based on motion estimation in a sequence of images of a scene and a predetermined depth profile for the scene.

14. A method of processing a depth map, comprising:
receiving an input depth map; and
generating a first processed depth map by processing a plurality of first pixels of the input depth map in a bottom to top direction;
wherein the processing of each first pixel of the plurality of first pixels comprises:
obtaining a first depth value for the first pixel in the input depth map, and
determining a second depth value based on depth values in the first processed depth map for a first set of pixels that are below the first pixel in the first processed depth map,
if the first depth value is further back than the second depth value, setting the depth value of the first pixel to the first depth value, and
if the second depth value is further back than the first depth value, setting the depth value of the first pixel to the second depth value.

15. The method of claim 14, wherein the first set of pixels comprises pixels of a row immediately below a row of the first pixel.

16. The method of claim 14, wherein the first set of pixels comprises no more than 20 pixels.

17. The method of claim 14, further comprising generating a second processed depth map by processing a plurality of second pixels in the first processed depth map in a top to bottom direction,
wherein generating a depth value for each second pixel in the second processed depth map comprises:
determining a third depth value of the first processed map for a third pixel that is above the second pixel; and
obtaining a fourth depth value for the second pixel in the first processed depth map,
if a depth step is met, setting the depth value for the second pixel in the second process depth map to the third value, and
if the depth step is not met, setting the depth value for the second pixel in the second process depth map to the fourth value,
wherein the depth step criterion is dependent on depth steps both in the input depth map and in the first processed depth map.

18. The method of claim 17, wherein the depth step criterion requires that an absolute value of a depth step in the input depth map is not above a first threshold and that a backwards depth step in the first processed image is not below a second threshold.

19. The method of claim 17, wherein the depth step criterion comprises a requirement that an absolute value of a depth step in the input depth map between the third pixel and a pixel above the second pixel is not above a third threshold.

20. A non-transitory computer-readable storage medium that stores instructions, wherein the instructions cause a processor circuit to:
receive an input depth map; and
generate a first processed depth map by processing a plurality of first pixels of the input depth map in a bottom to top direction;
wherein the processing of each first pixel of the plurality of first pixels comprises:
obtaining a first depth value for the first pixel in the input depth map, and
determining a second depth value based on depth values in the first processed depth map for a first set of pixels that are below the first pixel in the first processed depth map,
if the first depth value is further back than the second depth value, setting the depth value of the first pixel to the first depth value, and
if the second depth value is further back than the first depth value, setting the depth value of the first pixel to the second depth value.

* * * * *